US012403562B2

(12) United States Patent
Bader et al.

(10) Patent No.: US 12,403,562 B2
(45) Date of Patent: Sep. 2, 2025

(54) COOLING LUBRICANT NOZZLE CARRIER FOR A GRINDING MACHINE, GRIND-ING MACHINE HAVING SUCH A COOLING LUBRICANT NOZZLE CARRIER, AND METHOD FOR OPERATING A COOLING LUBRICANT NOZZLE CARRIER

(71) Applicant: ADELBERT HAAS GMBH, Trossingen (DE)

(72) Inventors: Thomas Bader, Gosheim (DE); Tim Kern, Donaueschingen (DE); Werner Hartmut Klotzin, Donaueschingen (DE); David Stange, Stockach (DE)

(73) Assignee: ADELBERT HAAS GMBH, Trossingen (DE)

( * ) Notice: Subject to any disclaimer, the term of this patent is extended or adjusted under 35 U.S.C. 154(b) by 356 days.

(21) Appl. No.: 17/961,881

(22) Filed: Oct. 7, 2022

(65) Prior Publication Data

US 2023/0115142 A1 Apr. 13, 2023

(30) Foreign Application Priority Data

Oct. 13, 2021 (DE) ......................... 102021126504.5

(51) Int. Cl.
*B05B 13/04* (2006.01)
*B24B 55/02* (2006.01)

(52) U.S. Cl.
CPC .......... *B24B 55/02* (2013.01); *B05B 13/0405* (2013.01)

(58) Field of Classification Search
CPC ............................ B05B 13/0405; B24B 55/02
(Continued)

(56) References Cited

U.S. PATENT DOCUMENTS 2,534,941 A * 12/1950 Baldenhofer ........... B24B 27/06 451/28
4,619,081 A * 10/1986 Lipanski .............. B23Q 11/005 125/11.01

(Continued)

FOREIGN PATENT DOCUMENTS

DE 20005648 U1 5/2000
DE 102009043677 A1 4/2011

(Continued)

OTHER PUBLICATIONS

DE102016012904 Google translated English (Year: 2018).*

(Continued)

*Primary Examiner* — Chee-Chong Lee
(74) *Attorney, Agent, or Firm* — Nath, Goldberg & Meyer; Jerald L. Meyer; Stanley N. Protigal

(57) ABSTRACT

The invention relates to a cooling lubricant nozzle carrier (100) for a grinding machine (1), the cooling lubricant nozzle carrier (100) having a central arm (150) and two side arms (130, 140) arranged on the central arm (150) such that they can move relative to the central arm (150), and the cooling lubricant nozzle carrier (100) having at least two cooling lubricant nozzles (110, 120), at least one of which is arranged on each of the side arms (130, 140), wherein the side arms (130, 140) are each movably mounted relative to the central arm (150) in such a way that the cooling lubricant nozzle (110, 120) arranged on a particular side arm (130, 140) moves together with the side arm (130, 140) on a circular path when the side arm (130, 140) in question moves; a grinding machine having such a cooling lubricant nozzle carrier; and a method for operating such a grinding machine.

17 Claims, 6 Drawing Sheets

(58) Field of Classification Search
USPC .......................................................... 239/752
See application file for complete search history.

(56) References Cited

U.S. PATENT DOCUMENTS

| | | | | | |
|---|---|---|---|---|---|
| 4,679,970 | A | * | 7/1987 | Lohneis | B23Q 5/048 408/128 |
| 4,822,218 | A | * | 4/1989 | Satoh | B23Q 1/0018 451/450 |
| 4,929,130 | A | * | 5/1990 | Diebolt | B24B 55/02 29/DIG. 87 |

FOREIGN PATENT DOCUMENTS

| | | | |
|---|---|---|---|
| DE | 102010026777 | A1 | 1/2012 |
| DE | 102012104263 | A1 | 11/2013 |
| DE | 102015116035 | A1 | 3/2016 |
| DE | 102016012904 | A1 | 4/2018 |
| DE | 102019006362 | A1 | 3/2021 |
| EP | 1886764 | A1 | 2/2008 |
| JP | 2015051478 | A | 3/2015 |
| WO | 2014/035789 | A1 | 3/2014 |

OTHER PUBLICATIONS

JP2015051478A Google translated English (Year: 2015).*
Office Action issued Aug. 25, 2022, in corresponding German application No. 10 2021 126 504.5.
Search report issued Mar. 7, 2023, in parallel pending European patent application No. 22 188 015.6.

* cited by examiner

COOLING LUBRICANT NOZZLE CARRIER FOR A GRINDING MACHINE, GRIND-ING MACHINE HAVING SUCH A COOLING LUBRICANT NOZZLE CARRIER, AND METHOD FOR OPERATING A COOLING LUBRICANT NOZZLE CARRIER

BACKGROUND

When grinding, the interaction of the grinding wheel with the workpiece can lead to a significant generation of heat, in particular due to the friction and the shearing work performed when separating chips from the workpiece. If this heat dissipates into the workpiece, it may to lead to overheating which changes the material properties of the workpiece, in particular to grinding burn. Furthermore, insufficient cooling can also lead to flying sparks or, in the presence of oil mists, to deflagrations.

In order to counteract such effects, it is known to use cooling lubricants during grinding, for example oils or emulsions of oils with water and additives, which are sprayed using nozzles at the point at which heat is being generated. In this way, the productivity of the grinding machine and the quality of the workpieces produced can be noticeably improved, as can the safety of the grinding machine.

However, it has proven to be critical to provide these cooling lubricants at the right place at all times of the machining process. It is therefore known from the prior art, in particular from EP 3 208 037 B1, to arrange cooling lubricant nozzles on a movable cooling lubricant nozzle carrier by means of which the position of the cooling lubricant nozzles can be adjusted. When using the hitherto known cooling lubricant nozzle carriers, however, in some situations the risk of a collision with the workpiece, the clamping means, and other machine parts cannot be ruled out or can only be avoided by compromising on the precision with which the cooling lubricant is sprayed at the machining point.

SUMMARY

The object of the invention is to provide a cooling lubricant nozzle carrier for a grinding machine, a grinding machine having such a cooling lubricant nozzle carrier, and a method for operating a cooling lubricant nozzle carrier which improve the avoidance of collisions and allow increased precision when providing the cooling lubricant at the point where it is needed. This object is achieved by a cooling lubricant nozzle carrier for a grinding machine, and a method for operating a cooling lubricant nozzle carrier. The cooling lubricant nozzle carrier has a central arm and two side arms arranged on the central arm so as to be movable relative to the central arm. The cooling lubricant nozzle carrier has at least two cooling lubricant nozzles, at least one of which is arranged on one of the side arms. The side arms are each movably mounted relative to the central arm in such a way that the cooling lubricant nozzle arranged on a particular side arm moves together with said particular side arm on a portion of a circular path when said particular side arm moves. The side arms are mutually offset relative to the central axis of the circular path on which one of the cooling lubricant nozzles moves together with its respective side arm when that side arm moves.

The cooling lubricant nozzle carrier according to the invention for a grinding machine has a central arm and two side arms arranged on the central arm such that they can move relative to the central arm and has at least two cooling lubricant nozzles, at least one of which is arranged on each of the side arms.

The central arm can also be formed by a component of a grinding machine that is already present, for example the console of the spindle.

It is essential to the invention that the side arms are each mounted so as to be movable relative to the central arm in such a way that the cooling lubricant nozzle arranged on a particular side arm moves together with the side arm on a portion of a circular path when the side arm in question moves, such that the cooling lubricant nozzles can be positioned, at least in portions, around a grinding wheel of which the drive axis forms the central axis of the circular path.

The two cooling lubricant nozzles can each be used as a cooling nozzle and an extinguishing nozzle. In particular, this means that no cooling lubricant nozzle has to be moved more than 180° around the grinding wheel and it avoids the need for annular cooling lubricant nozzle carriers, which entail an increased risk of collision. At the same time, this increases the selection of possible cooling lubricant positions.

Allowing the two cooling lubricant nozzles to be adjusted separately supports optimal placement of the cooling lubricant and contributes to reducing the risk of collisions, and the possibility of moving along a circular path which ensures the positioning on the circumference of the grinding wheel greatly reduces the risk of collisions with the workpiece.

In order to minimize the risk of collision, it is particularly preferred for the side arms to be driven by a drive such that they can be moved individually. Different drive types are possible in addition to (geared) motors; for example, hydraulic, pneumatic, or mechatronic drives can also be used.

To further optimize the position of the jets of cooling lubricant expelled by the cooling lubricant nozzles, it is helpful if at least one cooling lubricant nozzle is driven by a motor, in particular a geared motor, so that it can be pivoted or rotated individually relative to the side arm on which it is arranged. In an advantageous embodiment, this can be achieved by virtue of external teeth being arranged on a holding portion of the cooling lubricant nozzle and interacting with a toothed rack portion or toothed wheel segment moved by the motor.

It is particularly preferred for the cooling lubricant nozzles to be replaceable such that the cooling lubricant nozzles can be adapted to the grinding wheel used.

A specific option for realizing this is for the cooling lubricant nozzles to be fastened to the side arms by means of a bayonet closure; however, other mechanical connections that can be established and released quickly can also be used.

In addition, it is preferred for a further cooling lubricant nozzle, which can be used in particular as a flushing nozzle, to be arranged on the central arm. To allow the expelled cooling lubricant jet to be adjusted in this case too, the additional cooling lubricant nozzle can have a nozzle plate that can be replaced, for example after loosening a screw connection.

It has proven to be particularly advantageous for the side arms to be in the shape of an annulus sector. For the purpose of this description, a side arm is in the shape of an annulus sector, in particular, if at least one of its surfaces running in parallel with the plane of the circular path on which the side arm can be moved relative to the central arm, at least in portions, has the shape of a circular sector, which may also have holes.

Further reducing the risk of collision and increasing the degrees of freedom of movement of the cooling lubricant nozzle carrier can be achieved by virtue of the side arms being mutually offset relative to the central axis of the circular path on which the cooling lubricant nozzles move together with the side arm when the side arm in question moves. In particular, this makes it possible for the side arms to also be moved into positions in which the two cooling lubricant nozzles are positioned relatively close to the central arm.

The grinding machine according to the invention, having a controller, which can in particular be designed as a CNC controller, having a workpiece holder for holding a workpiece to be machined, and having a grinding wheel arranged on a driven shaft is characterized in that the grinding machine also has a cooling lubricant nozzle carrier according to the invention.

The controller is preferably designed and set up to operate two cooling lubricant nozzles arranged on different side arms either as a cooling nozzle or as an extinguishing nozzle. In other words, the controller can simply swap over the roles of the cooling lubricant nozzles, and this may in particular also be accompanied by a change in the running direction of the grinding wheel.

If the controller is designed and set up to change the position of the cooling lubricant nozzles during operation, it is possible to react immediately to shifts in the grinding point, for example due to wear on the grinding wheel, a change in grinding strategy, or special features of the workpiece geometry.

In an advantageous development of the grinding machine, the grinding machine has a device for automatically replacing the cooling lubricant nozzles, for example a robot arm, a linear handling system, or cooling lubricant nozzle trays, in which the cooling lubricant nozzles can be placed and from which cooling lubricant nozzles can be picked up by the grinding spindle using the pick-up method. In this way, for example, an automated change of the grinding wheel can be supervised without having to access the machining space.

In some embodiments of the grinding machine, the central arm of the cooling lubricant nozzle carrier can also be formed by a component of the grinding machine that is already present, in particular by a console of a spindle of the grinding machine. The cooling lubricant nozzle carrier therefore does not necessarily have to be formed by a completely separate assembly.

In the method according to the invention for operating a grinding machine according to the invention, one cooling lubricant nozzle is used as a cooling nozzle and one cooling lubricant nozzle is used as an extinguishing nozzle. The method is characterized in that during the grinding at least one of the cooling lubricant nozzles is moved at least on a portion of a circular path. This circular path expediently leads around the grinding wheel of the grinding machine.

It is particularly advantageous if the method allows the direction of rotation of the grinding wheel to be changed at least once during the grinding and the role of the cooling lubricant nozzles is switched in the process and/or if, at least once during the grinding, one of the cooling lubricant nozzles is rotated relative to the side arm to which it is fastened in order to respond to changes in grinding geometry in situ during the grinding.

BRIEF DESCRIPTION OF THE DRAWINGS

The invention is explained in more detail below with reference to drawings showing exemplary embodiments, in which.

DETAILED DESCRIPTION

Since the drawings show the same embodiment of the invention, the same reference numbers are used in each case. However, to improve clarity, not all reference numbers are indicated in all the drawings.

Figure 1:
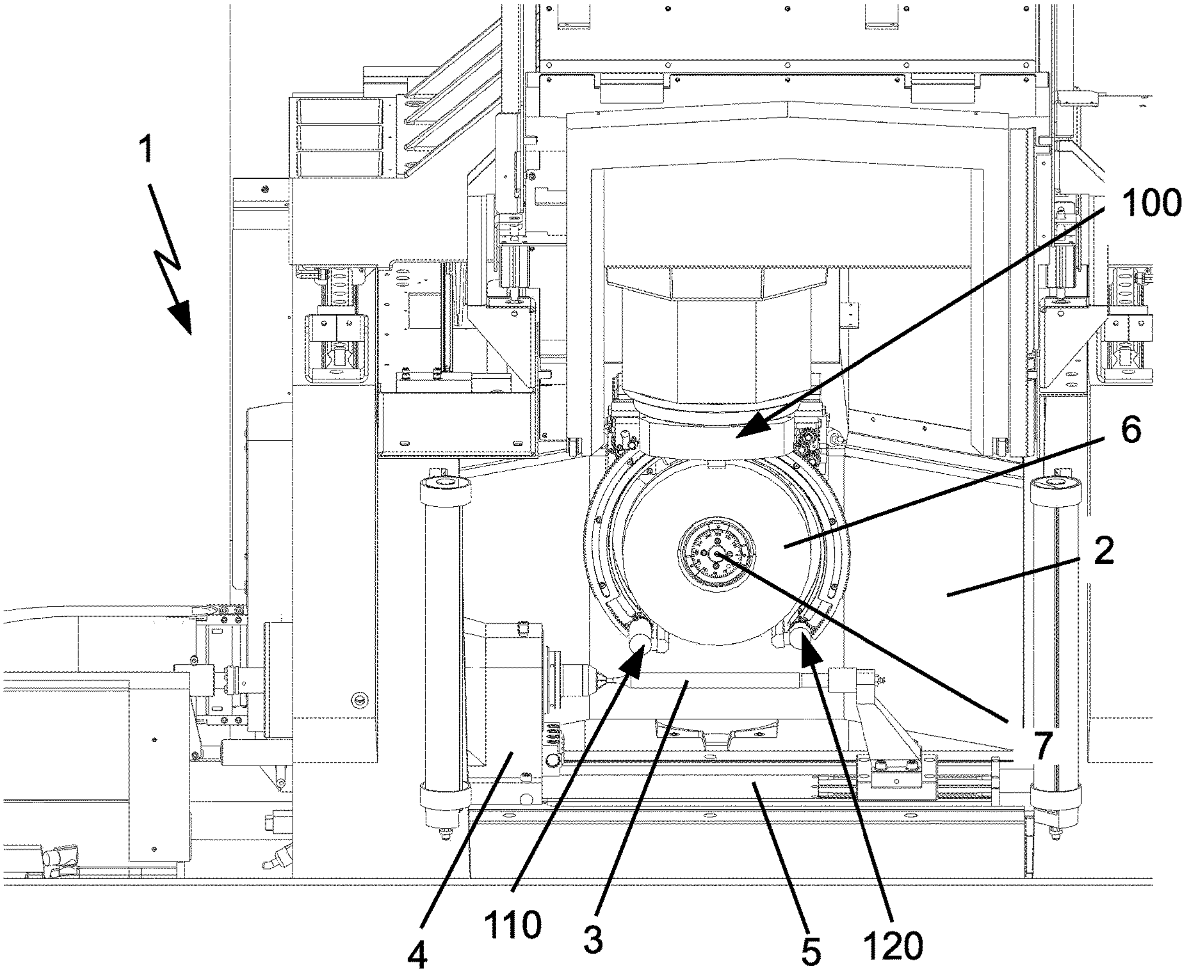
FIG. 1: is a view into the machining space of a grinding machine.
Figure 2:
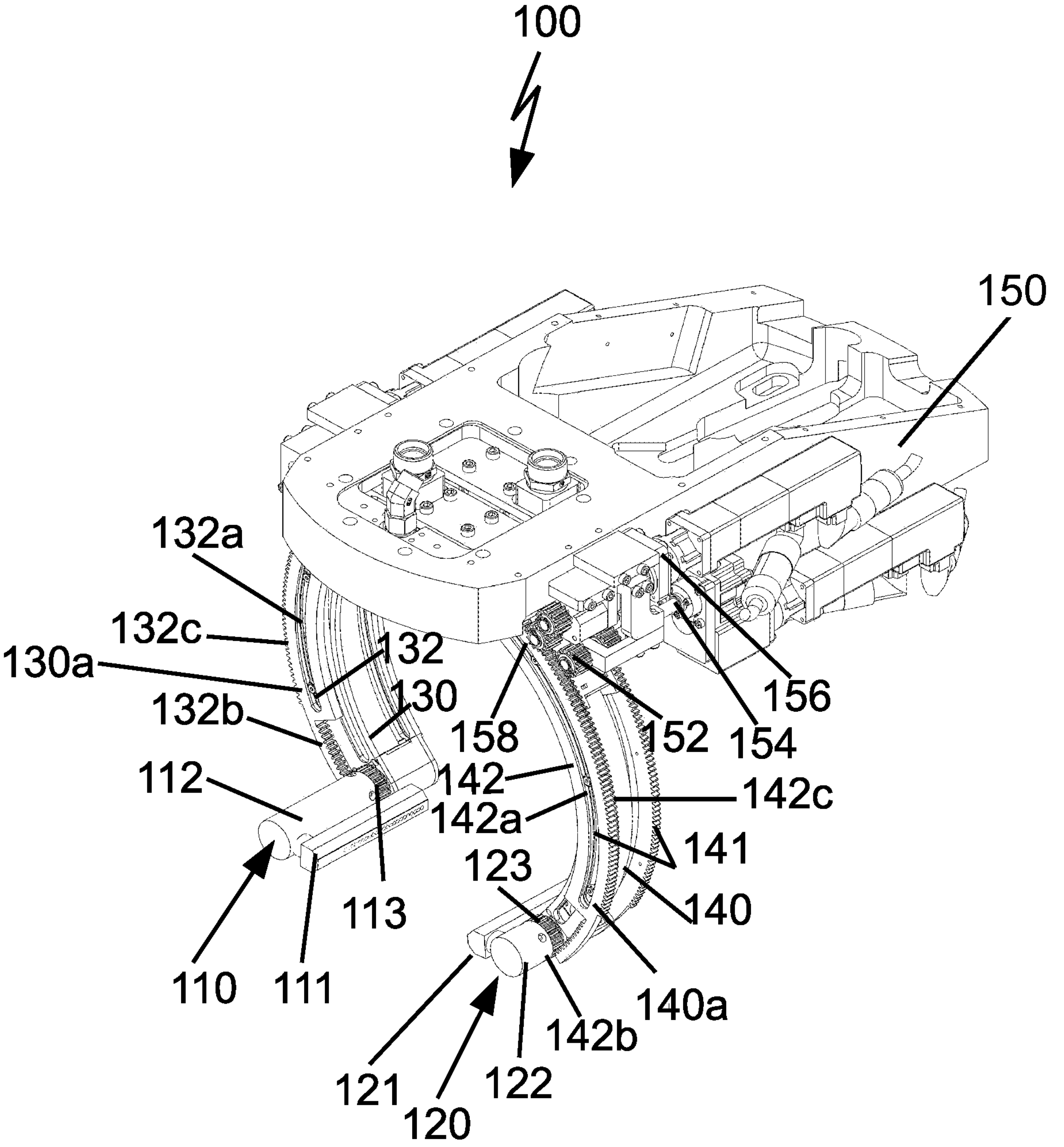
FIG. 2: shows a cooling lubricant nozzle carrier, fastened to the console of the grinding spindle.

FIG. 1 shows a grinding machine 1 in a perspective that primarily allows a view of its machining space 2, in which the machining of the workpiece 3 to be machined takes place.

For this purpose, the workpiece 3 is clamped so as to be rotatable about its longitudinal axis in the workpiece carrier 4, for example, which is arranged such that it can be moved on a carriage 5. The workpiece 3 is machined by means of the grinding wheel 6, which can be driven in both directions of rotation by means of a driven shaft 7 and can be moved together with the driven shaft 7 and the associated drive relative to the workpiece carrier 4 in multiple degrees of freedom.

A special feature of the grinding machine 1 shown in FIG. 1 is the cooling lubricant nozzle carrier 100, which is also explained in more detail below with reference to FIGS. 2 to 6, which show different views of the cooling lubricant nozzle carrier 100.

As can be seen in each of FIGS. 2 to 6, the cooling lubricant nozzle carrier 100 has two cooling lubricant nozzles 110, 120, which are each arranged in the end region of one of the two side arms 130, 140 in the shape of an annulus sector. The side arms 130, 140 in the shape of an annulus sector are mounted on a central arm 150 in such a way that they can each be moved in a plane that is perpendicular to the shaft 7 of the grinding wheel 6 along a circular path which can be provided in particular by a center line of the side arms 130, 140 in the shape of an annulus sector. Accordingly, the cooling lubricant nozzles 110, 120 can be freely positioned around the grinding wheel 6 on a circular path which can in particular extend in parallel with the circumference of the grinding wheel 6, and a mutual offset of the side arms 130, 140 in the shape of an annulus sector in the direction of the driven shaft 7—which is particularly clear in FIG. 5—ensures that, in all positions, a collision between the side arms 130, 140 in the shape of an annulus sector is avoided.

In order to still enable a symmetrical arrangement of the cooling lubricant nozzles 110, 120, the spray heads 111, 121 of the cooling lubricant nozzles 110, 120 are fastened to holding portions 112, 122 of the cooling lubricant nozzles 110, 120, which have a different length adapted to the offset of the side arms 130, 140 in the shape of an annulus sector.

In a preferred embodiment, the holding portions 112, 122, inside which the supply lines (not shown in the drawings) also run, via which lines the spray heads 111, 121 are supplied with cooling lubricant, can be connected via a bayonet closure to the side arms 130, 140 in the shape of an annulus sector and supply lines for cooling lubricant arranged therein or thereon. This type of connection allows the necessary sealing against the escape of cooling lubricant to be easily achieved, for example by compressing a sealing element, e.g., a sealing ring, in the transition area between the respective supply lines.

In addition, the establishing and releasing of the connection can be automated simply by using a robot arm or in the pick-up method, carried out by the grinding spindle, for example when the grinding wheel 6 is changed and spray heads 111, 121 with a different shape are therefore desired.

External teeth 113, 123 are also present in the end region of the holding portions 112, 122 of the cooling lubricant nozzles 110, 120 that faces the relevant side arm 130, 140 in the shape of an annulus sector. These external teeth enable rotation of the cooling lubricant nozzles 110, 120 by means of driven toothed wheel segments 132, 142 such that the direction in which the spray heads 111, 121 spray can be adjusted or tracked. In this way, for example, it is possible to easily compensate for the shifting of a grinding point, for example as a result of wear on the grinding wheel 6.

For this purpose, the toothed wheel segments 132, 142, the shape of which is adapted to that of the respective side arms 130, 140 in the shape of an annulus sector on which they rest, are provided with a guide slot 132*a*, 142*a* in which pins or screws 130*a*, 140*a* engage, such that the toothed wheel segment 132, 142 on the relevant side arm 130, 140 in the shape of an annulus sector can be moved in such a way that a portion having internal teeth 132*b*, 142*b* interacting with the relevant external teeth 113, 123 causes the holding portion 112, 122 to rotate. This movement is driven by motors 155, 156 arranged on the central arm, which interact with external teeth 132*c*, 142*c* of the toothed racks 132, 142 via gear wheel arrangements 157, 158 and which receive their movement commands from a controller of the grinding machine in order to automatically move the cooling lubricant nozzles 110, 120 and bring them into the particular position desired.

At their edge pointing away from the grinding wheel 6, the side arms 130, 140 in the shape of an annulus sector each have external teeth 131, 141. This makes it possible to automatically move each of the side arms 130, 140 in the shape of an annulus sector by means of pinions 151, 152 or, if necessary, via a transmission having (geared) motors 153, 154 arranged on the central arm 150, which motors receive their movement commands from a controller of the grinding machine to move automatically and bring into the particular position desired.

The drives, in particular the (geared) motors, and the cooling lubricant supply are designed in such a way that the nozzles can be adjusted during operation, in particular at a cooling lubricant pressure of more than 30 bar and a cooling lubricant volume flow of 260 l/min.

These degrees of freedom of movement allow the cooling lubricant nozzles 110, 120 to be moved independently of one another and automatically, in particular under CNC control, such that one is used as a cooling nozzle to feed cooling lubricant for cooling the grinding point or for workpiece cooling in the direction of rotation of the wheel just before the current grinding point in order to avoid impermissibly high temperatures, while the other is used as an extinguishing nozzle for extinguishing/cooling any sparks that may still occur and lead cooling lubricant past the grinding point near the grinding wheel against the direction of rotation of the grinding wheel.

The cooling lubricant nozzles 110, 120, the line systems which supply them with cooling lubricant, and the control of the cooling lubricant supply are adapted with regard to the pressure and throughput volume of the cooling lubricant in such a way that each of the cooling lubricant nozzles 110, 120 can be used both as a cooling and as an extinguishing nozzle, depending on the current direction of rotation of the grinding wheel 6. This configuration minimizes the risk of a collision with the workpiece, clamping means, or other machine components.

Figure 3:
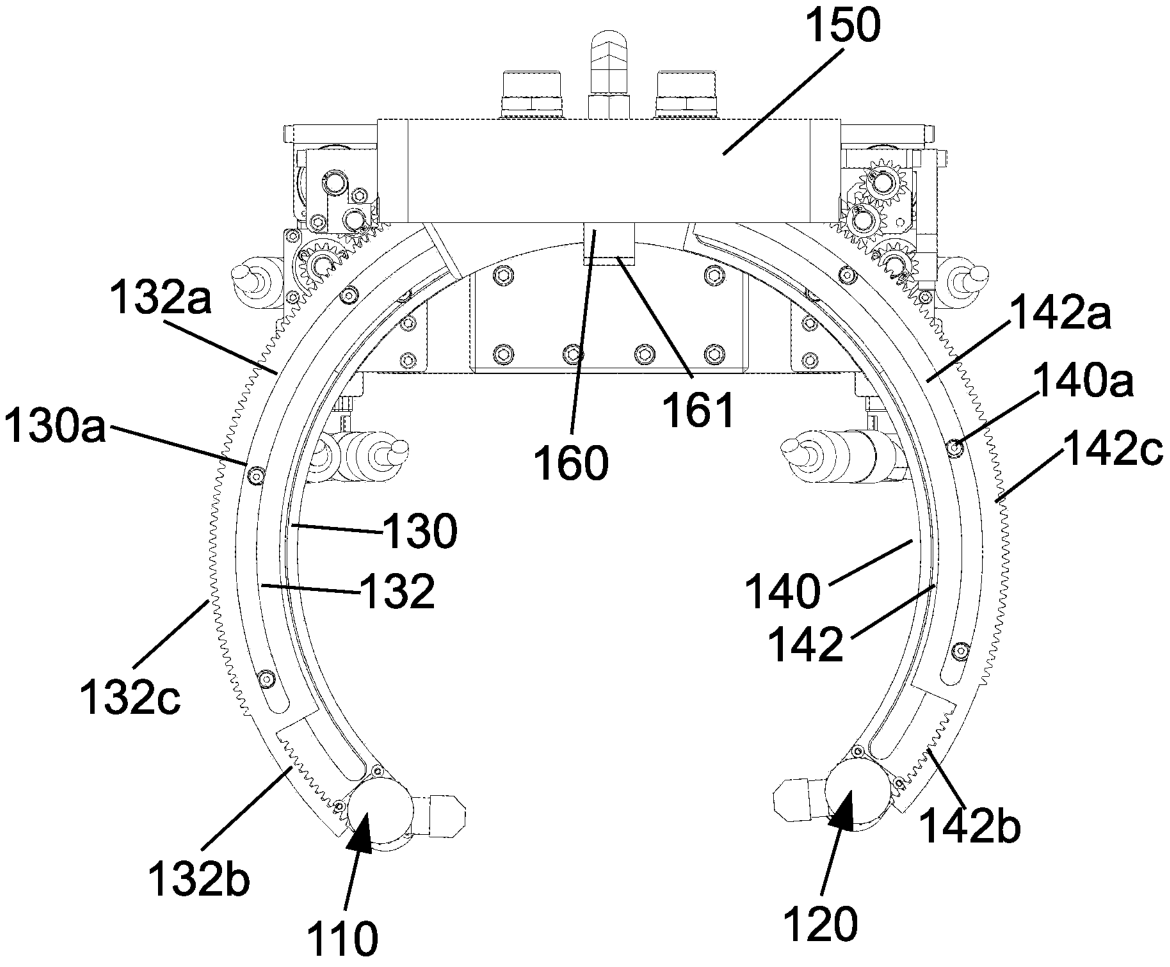
FIG. 3: shows the cooling lubricant nozzle carrier from FIG. 2 from the front.
Figure 4:
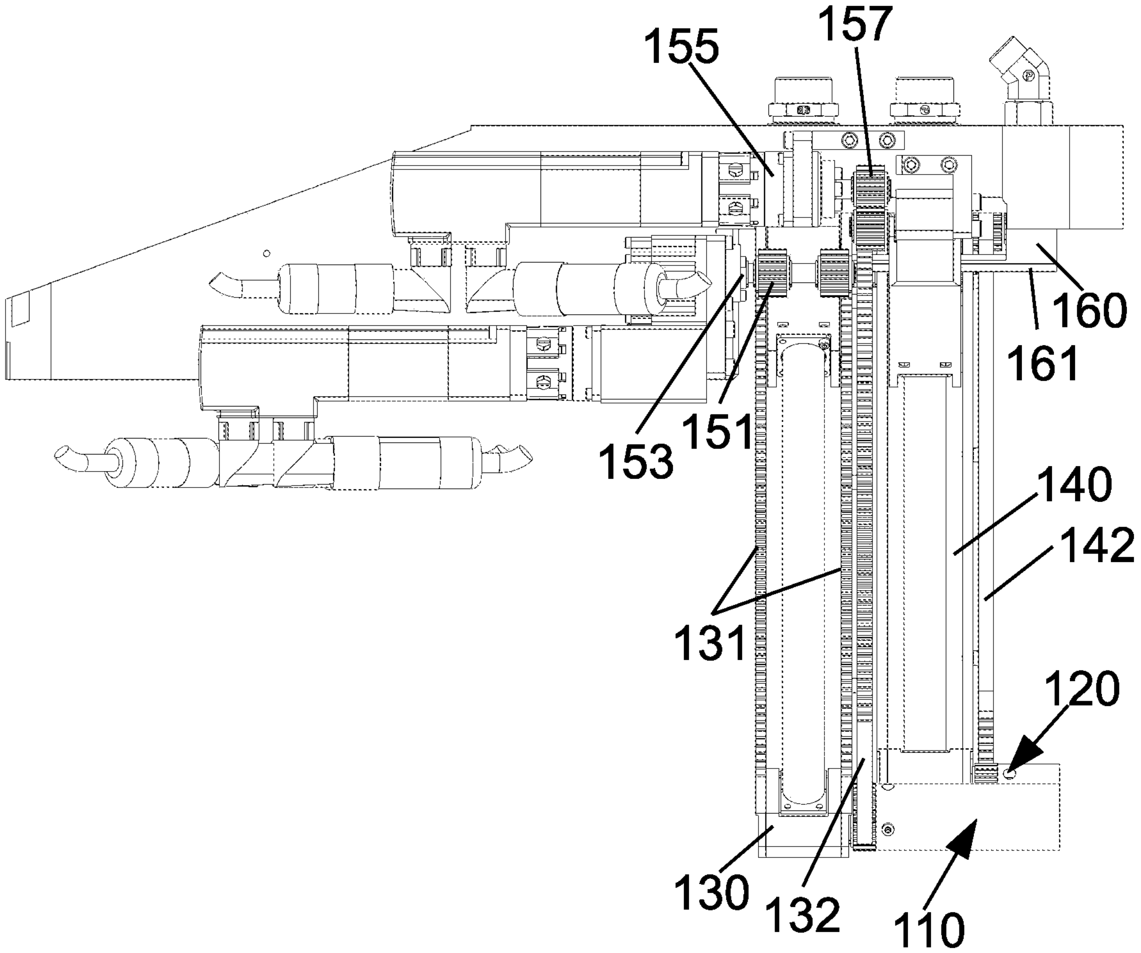
FIG. 4: shows the cooling lubricant nozzle carrier from FIG. 2 from one side.
Figure 5:
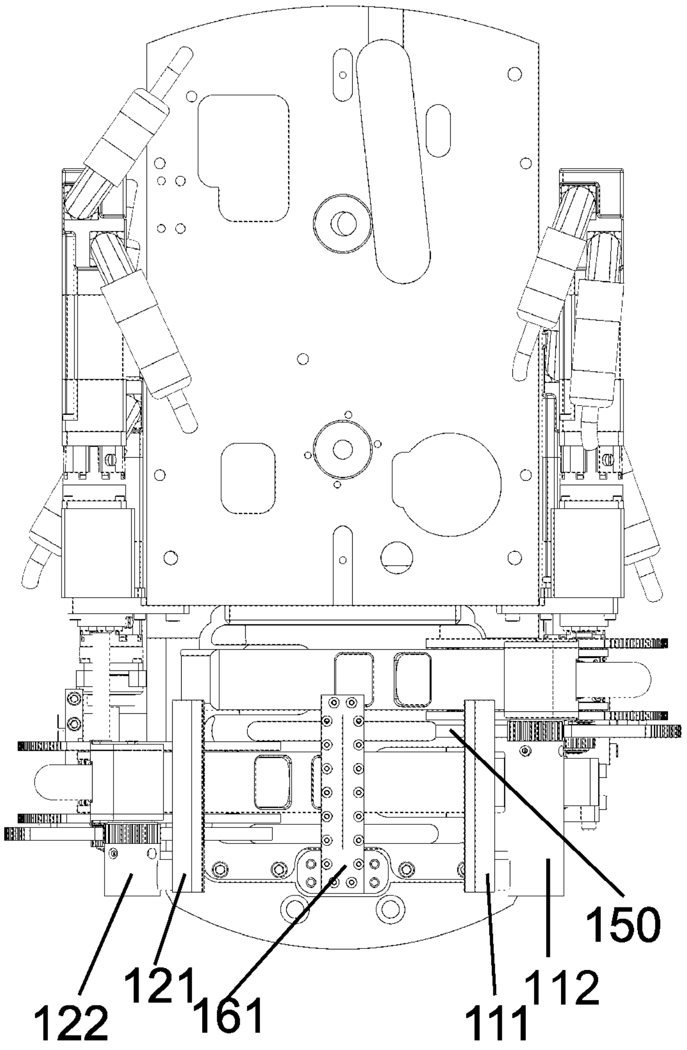
FIG. 5: shows the cooling lubricant nozzle carrier from FIG. 2 from below.
Figure 6:
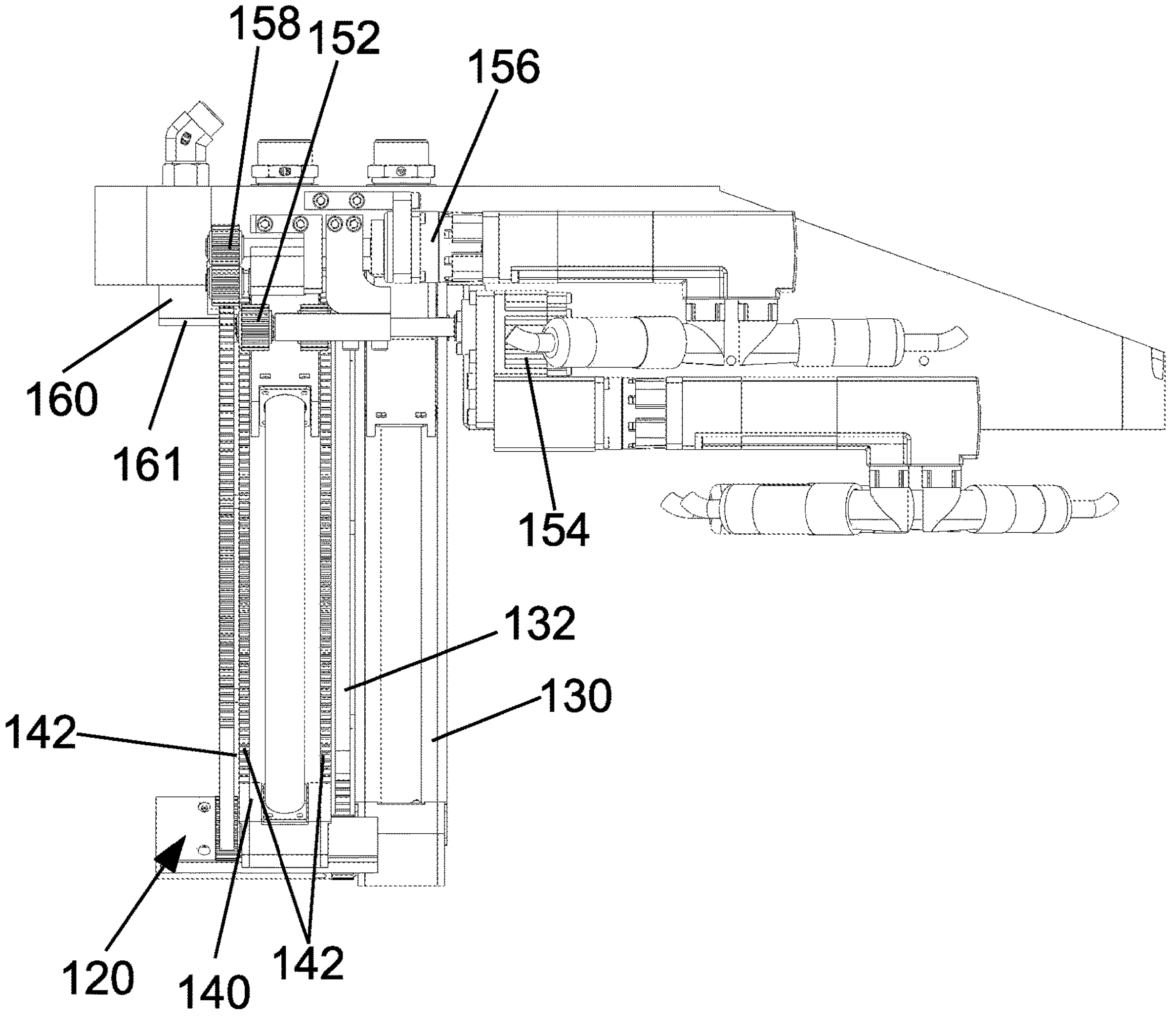
FIG. 6: shows the cooling lubricant nozzle carrier from FIG. 2 from the other side.

In addition, in the embodiment of the cooling lubricant nozzle carrier 100 shown in FIGS. 1 to 6, there is another cooling lubricant nozzle 160, namely the flushing nozzle, which can be seen particularly well in FIG. 3, is stationary on the central arm 150 of the cooling lubricant nozzle carrier, and the spray pattern of which can be influenced by a replaceable nozzle plate 161 that can be seen particularly well in FIG. 5. The flushing nozzle is typically operated at a higher cooling lubricant pressure, for example 70 bar, and lower cooling lubricant volume flows, for example 30 l/min, than the cooling nozzle and the extinguishing nozzle.

LIST OF REFERENCE SIGNS

1 Grinding machine
2 Machining space
3 Workpiece
4 Workpiece carrier
5 Carriage
6 Grinding wheel
7 Shaft
100 Cooling lubricant nozzle carrier
110, 120, 160 Cooling lubricant nozzle
111, 121 Spray head
112, 122 Holding portion
113, 123 External teeth
130, 140 Side arm
130*a*, 140*a* Pins or screws
131, 141 External teeth
132, 142 Toothed wheel segment
132*a*, 142*a* Guide slot
132*b*, 142*b* Internal teeth
132*c*, 142*c* External teeth
150 Central arm
151, 152 Pinion
153, 154, 155, 156 Motor
157, 158 Gear wheel arrangement
161 Nozzle plate

The invention claimed is:

1. A cooling lubricant nozzle carrier (100) for a grinding machine (1), the cooling lubricant nozzle carrier (100) having a central arm (150) and two side arms (130, 140) arranged on the central arm (150) so as to be movable relative to the central arm (150), and the cooling lubricant nozzle carrier (100) having at least two cooling lubricant nozzles (110, 120), at least one of which is arranged on one of the side arms (130, 140), characterized in that:

the side arms (130, 140) are each movably mounted relative to the central arm (150) in such a way that the cooling lubricant nozzle (110, 120) arranged on a particular side arm (130, 140) moves together with said particular side arm (130, 140) on a portion of a circular path when said particular side arm (130, 140) moves; and the side arms (130, 140) are mutually offset relative to the central axis of the circular path on which one of the cooling lubricant nozzles (110, 120) moves together with its respective side arm (130, 140) when that side arm (130, 140) moves.

2. The cooling lubricant nozzle carrier (100) according to claim 1, characterized in that the side arms (130, 140) are driven by a drive such that they can be moved individually.

3. The cooling lubricant nozzle carrier (100) according to claim 1, characterized in that at least one cooling lubricant nozzle (110, 120) is driven by a motor (155, 156) such that it can be pivoted individually.

4. The cooling lubricant nozzle carrier (100) according to claim 3, characterized in that said at least one cooling lubricant nozzle (110, 120) driven by the motor (155, 156) can be pivoted by virtue of external teeth (113, 123) being arranged on a holding portion (112, 122) of the cooling lubricant nozzle (110, 120) and interacting with a toothed rack portion or a toothed wheel segment (132, 142) having internal teeth (132*b*, 142*b*) and being moved by the motor (155, 156).

5. The cooling lubricant nozzle carrier (100) according to claim 1, characterized in that said at least two cooling lubricant nozzles (130, 140) are replaceable.

6. The cooling lubricant nozzle carrier (100) according to claim 5, characterized in that the cooling lubricant nozzles (110, 120) are secured to the side arms (130, 140) by means of a bayonet closure.

7. The cooling lubricant nozzle carrier (100) according to claim 1, characterized in that a further cooling lubricant nozzle (160) is arranged on the central arm (150).

8. The cooling lubricant nozzle carrier (100) according to claim 7, characterized in that the further cooling lubricant nozzle (160) has a replaceable nozzle plate (161).

9. The cooling lubricant nozzle carrier (100) according to claim 1, characterized in that the side arms (130, 140) are in the shape of an annulus sector.

10. A grinding machine (1) having a controller, a workpiece holder (4) for holding a workpiece (3) to be machined, and a grinding wheel (6) arranged on a driven shaft (7), characterized in that the grinding machine (1) also has a cooling lubricant nozzle carrier (100) according to claim 1.

11. The grinding machine (1) according to claim 10, characterized in that the controller is designed and set up to operate the two cooling lubricant nozzles (110, 120) arranged on different side arms (130, 140) either as a cooling nozzle or as an extinguishing nozzle.

12. The grinding machine (1) according to claim 10, characterized in that the controller is designed and set up to change a position of the cooling lubricant nozzles (110, 120) during operation.

13. The grinding machine (1) according to claim 10, characterized in that the central arm (150) is formed by a component of the grinding machine (1).

14. The grinding machine (1) according to claim 10, characterized in that the central arm (150) is formed by a console of a spindle of the grinding machine (1).

15. A method for operating a grinding machine (1) according to claim 10, in which one cooling lubricant nozzle (110, 120) is used as a cooling nozzle and one cooling lubricant nozzle (120, 110) is used as an extinguishing nozzle, characterized in that during the grinding at least one of the cooling lubricant nozzles (110, 120) is moved at least on a portion of a circular path.

16. The method according to claim 15, characterized in that a direction of rotation of the grinding wheel (6) is changed at least once during the grinding and a cooling or lubricant role of the cooling lubricant nozzles (110, 120) is switched in the process.

17. The method according to claim 15, characterized in that, at least once during the grinding, one of the cooling lubricant nozzles (110, 120) is rotated relative to the side arm (130, 140) to which it is fastened.

* * * * *